(12) United States Patent
Stoilov et al.

(10) Patent No.: US 10,628,640 B2
(45) Date of Patent: Apr. 21, 2020

(54) MULTI-MODE NFC/RFID SCANNING

(71) Applicant: SOCKET MOBILE, INC., Newark, CA (US)

(72) Inventors: Ivan G. Stoilov, Sunnyvale, CA (US); Vincent J. Coli, Mountain View, CA (US); Steven Glyn Jones, Fleet (GB)

(73) Assignee: Socket Mobile, Inc., Newark, CA (US)

( * ) Notice: Subject to any disclaimer, the term of this patent is extended or adjusted under 35 U.S.C. 154(b) by 12 days.

(21) Appl. No.: 16/231,104

(22) Filed: Dec. 21, 2018

(65) Prior Publication Data

US 2019/0197267 A1 Jun. 27, 2019

Related U.S. Application Data

(60) Provisional application No. 62/609,322, filed on Dec. 21, 2017.

(51) Int. Cl.
 *G06K 7/10* (2006.01)
(52) U.S. Cl.
 CPC ..... *G06K 7/10207* (2013.01); *G06K 7/10386* (2013.01); *G06K 2007/10524* (2013.01)
(58) Field of Classification Search
 CPC ........... G06K 7/10198; G06K 7/10207; G06K 7/10386; G06K 2007/10524
 USPC ....................................................... 235/451
 See application file for complete search history.

(56) References Cited

U.S. PATENT DOCUMENTS

| | | | | |
|---|---|---|---|---|
| 5,132,523 A * | 7/1992 | Bassett | ............. | G06K 7/10871 235/455 |
| 5,869,840 A * | 2/1999 | Helton | ............... | G06K 7/10851 235/472.01 |
| 6,410,931 B1 * | 6/2002 | Dvorkis | ............. | G06K 7/10594 235/462.01 |
| 6,978,938 B2 * | 12/2005 | Tsunobuchi | ............. | G06K 7/10 235/462.15 |
| 7,243,850 B2 * | 7/2007 | Tamburrini | ........ | G06K 7/10693 235/462.25 |
| 8,186,597 B1 * | 5/2012 | Fletcher | ............. | G06K 7/10881 235/462.25 |
| 8,517,273 B2 * | 8/2013 | Tamburrini | ........ | G06K 7/10881 235/470 |
| 9,087,251 B2 * | 7/2015 | Tamburrini | ........ | G06K 7/10881 |

(Continued)

*Primary Examiner* — Paultep Savusdiphol
(74) *Attorney, Agent, or Firm* — PatentVentures; Bennett Smith; Korbin Van Dyke

(57) ABSTRACT

During hand-held operation, configuration of an NFC/RFID Reader/Writer peripheral device in a predefined mode named "Mobile Mode with Auto-Collection", enables recognition of a long duration (e.g. 5 second) trigger press (AKA a "Long Press") as an enabling event prompting a change of scan behavior between single-shot scan operation and continuous scan operation. In other defined Modes of the peripheral device, other predetermined enabling events, such as the presence or absence of a predetermined external power source, prompt the change between single-shot and continuous scan operations. The Long Press and the other intuitive features enable the general user to be able to switch between various modes and to do so without requiring acquisition or use of an additional dedicated scanner with its requisite expense or inconvenience, and without requiring advanced knowledge, special access, or special resources.

21 Claims, 6 Drawing Sheets

(56) References Cited

U.S. PATENT DOCUMENTS

| | | | | |
|---|---|---|---|---|
| 2002/0185536 | A1* | 12/2002 | Tsunobuchi | G06K 7/10 235/454 |
| 2006/0060655 | A1* | 3/2006 | Tsunobuchi | G06K 7/10 235/462.48 |
| 2007/0267490 | A1* | 11/2007 | Jerabeck | G07G 1/0018 235/383 |
| 2007/0267501 | A1* | 11/2007 | Jovanovski | G06K 7/10722 235/472.01 |
| 2009/0108076 | A1* | 4/2009 | Barkan | G06K 7/0004 235/462.48 |
| 2009/0321525 | A1* | 12/2009 | Barkan | G06K 7/10346 235/472.01 |
| 2011/0290889 | A1* | 12/2011 | Tamburrini | G06K 7/10881 235/470 |
| 2012/0145793 | A1* | 6/2012 | Kearney | G06K 7/109 235/472.02 |
| 2013/0341406 | A1* | 12/2013 | Tamburrini | G06K 7/10881 235/470 |
| 2019/0130150 | A1* | 5/2019 | Handshaw | G06K 7/1413 |

* cited by examiner

MULTI-MODE NFC/RFID SCANNING

CROSS REFERENCE TO RELATED APPLICATIONS

To the extent permitted by the type of the instant application, this application incorporates by reference for all purposes the following applications, all commonly owned with the instant application not later than the effective filing date of the instant application:

U.S. Provisional Application Ser. No. 62/609,322, filed 12-21-2017, first named inventor Ivan G. STOILOV, and entitled MULTI-MODE NFC/RFID SCANNING.

BACKGROUND

Field

Advancements in NFC/RFID peripheral device scanning are needed to provide improvements in cost, profitability, performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Improvements in NFC/RFID peripheral device scanning are needed to improve user and developer experience by enabling selective feature accessibility and utilization, enhance the user interface, facilitate switching to the most appropriate scan mode configuration, facilitate optimal power use, and provide for intuitive and forgiving operation.

In so-called continuous scanning, without requiring a trigger event, the scanner looks for one RFID tag, performs a read (and then stores or transmits the tag data), and repeats this behavior indefinitely. Continuous scanning is often preferable for high volume hands-free unattended object scans, for example for scanning a train of objects in the tracking of warehouse stock and manufacturing assemblies, or for common self-service customer transactions that don't require worker or management involvement. RFID scanners for continuous scanning are typically designed for unattended hands-free scanning and generally do not have any closed-case exposed controls, beyond a power switch. Reconfiguration, including access to advanced options or features (if any), may require advanced knowledge, special access, or special resources, typically unavailable to the general user.

In so-called single-shot scanning, in response to a trigger event, the scanner looks for one RFID tag, performs a read (and then stores or transmits the tag data), and then stops (does not look for another RFID tag) until another trigger event. Single-shot scanning is often preferable for scans of people, scans with associated ad hoc/custom customer service transactions, scans where mistakes would be costly or diminish customer goodwill, scans where an operator has a job responsibility to perform the scan, capital or high value asset inventory scans, critical security or safety checks, extended mobile scanning where power conservation is important, or where it is important not to scan objects or people accidentally or multiple times. RFID scanners for single-shot scanning are typically designed for portable or mobile hand-held scanning. Reconfiguration, including access to advanced options or features (if any), may require advanced knowledge, special access, or special resources, typically unavailable to the general user.

While each of continuous scanning and single-shot scanning have respective application areas, such as the examples above where they are particularly suited, use cases exists where it is at least sometimes desirable for the general user to be able to switch between these two modes of scanning and to do so without requiring acquisition or use of an additional dedicated scanner with its requisite expense or inconvenience, and without requiring advanced knowledge, special access, or special resources.

SYNOPSIS

The invention may be implemented in numerous ways, e.g. as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

During hand-held operation, configuration of an NFC/RFID Reader/Writer peripheral device in a predefined mode named "Mobile Mode with Auto-Collection", enables recognition of a long duration (e.g. 5 second) trigger press (AKA a "Long Press") as an enabling event prompting a change of scan behavior between single-shot scan operation and continuous scan operation. In other defined Modes of the peripheral device, other predetermined enabling events, such as the presence or absence of a predetermined external power source, prompt the change between single-shot and continuous scan operations. The Long Press and the other intuitive features enable the general user to be able to switch between various modes and to do so without requiring acquisition or use of an additional dedicated scanner with its requisite expense or inconvenience, and without requiring advanced knowledge, special access, or special resources.

DETAILED DESCRIPTION

Figure 1:
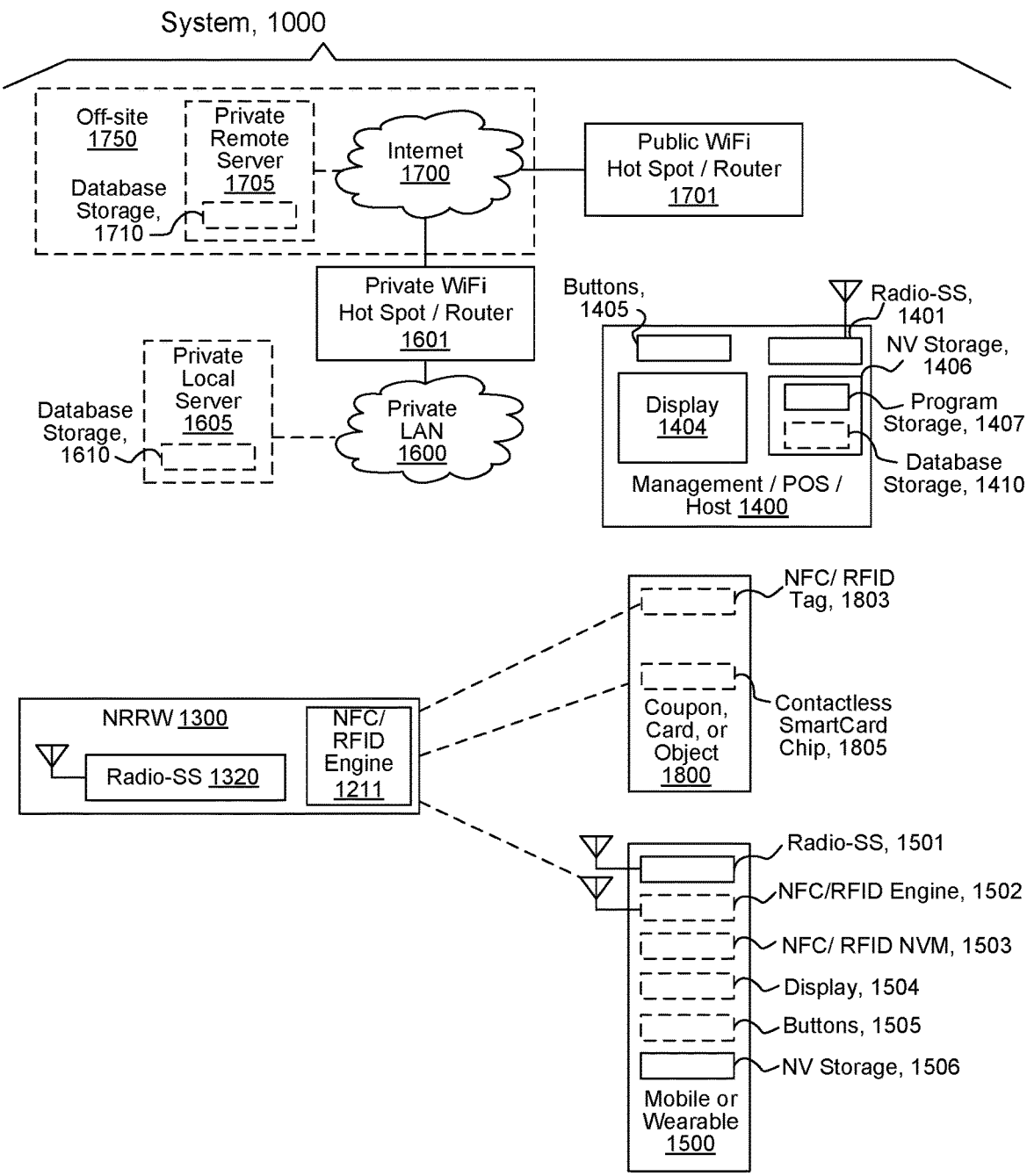
FIG. 1 illustrates, via a structural system perspective, embodiments of a peripheral device for NFC/RFID scanning.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

In some embodiments, a peripheral device for NFC/RFID scanning is able to toggle between a single-shot scan behavior and a continuous scan behavior via selective user operation of the trigger. During hand-held "single-shot scanning", when you "short press" the trigger button (e.g. 1 second or less), the NRRW will poll and perform a read operation of a single tag/card. Additionally during "single-shot scanning", when you "long press" the trigger button (e.g., 5 seconds or more), the NRRW will start "continuous scanning" (polling and reading tags/cards repeatedly, indefinitely). Similarly, during "continuous scanning", a "long press" will toggle back to "single-shot scanning" In some embodiments, the long press behavior is selectively enabled in a so-called Auto-Collection sub-mode of hand-held operation, and disabled otherwise.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method comprising:
discovering an RFID tag;
fetching data from the discovered RFID tag;
formatting the fetched data;
sending the formatted data to a host;
waiting for an acknowledgment from the host;
responsive to receiving the acknowledgement, providing user feedback to a user;
wherein in accordance with a first operating behavior, the discovering is responsive to a request-scan event and in accordance with a second operating behavior the discovering is continuously repetitive in accordance with repetitive polling;
further comprising toggling between the first operating behavior and the second operating behavior responsive to an operating-behavior-toggle event;
wherein the request-scan event and the operating-behavior-toggle event are indicated at least in part by corresponding durations of activating a same pressure-sensitive element by the user; and
wherein the discovering, the fetching, the formatting, the sending, the waiting, the providing, and the toggling are performed by a portable RFID scanner.

EC2) The method of EC1, wherein the pressure-sensitive element is a trigger button of the portable RFID scanner.

EC3) The method of EC1, wherein the duration corresponding to the request-scan event is equal to or less than one second.

EC4) The method of EC1, wherein the duration corresponding to the operating-behavior-toggle event is equal to or greater than five seconds.

EC5) The method of EC1, wherein the portable RFID scanner is powered by at least one of an internal battery and at least a first external power source, and wherein when operating in the first operating behavior and the first external power source is removed, when the first external power source is reapplied, operating resumes in the first operating behavior; and when operating in the second operating behavior and the first external power source is removed, when the first external power source is reapplied, operating resumes in the second operating behavior.

EC6) The method of EC1, wherein the portable RFID scanner is powered by at least one of an internal battery and at least a first external power source, and wherein in each of the first operating behavior and the second operating behavior, the operating-behavior-toggle event is further indicated by removal of the first external power source; and wherein in each of the first operating behavior and the second operating behavior, the operating-behavior-toggle event is further indicated by restoration of the first external power source.

EC7) A portable scanning peripheral for a host, the peripheral comprising:
  a scan engine;
  at least one communications subsystem enabled to communicate with the host;
  a user interface;
  a control subsystem comprising a processor and memory and enabled to communicate with each of the scan engine, the at least one communications subsystem, and the user interface;
  wherein the peripheral is selectively enabled to perform in one of a plurality of scan modes, comprising a single-scan mode and a continuous-scan mode;
  wherein in the single-scan mode the peripheral performs respective single scans in response to respective scan requests as manually commanded by a first predetermined activation duration of a predetermined control of the user interface;
  wherein in the continuous-scan mode the peripheral performs repetitive scans without requiring respective scan requests; and
  wherein the peripheral transitions between the single-scan mode and the continuous-scan mode as manually commanded by a second predetermined activation duration of the same control of the user interface.

EC8) The peripheral of EC7, wherein the first predetermined activation duration is equal to or less than one second.

EC9) The peripheral of EC7, wherein the second predetermined activation duration is equal to or greater than five seconds.

EC10) The peripheral of EC7, wherein each transition between the single-scan mode and the continuous-scan mode is signaled to the user by one or more transducers of the user interface.

EC11) The peripheral of EC7, wherein each transition between the single-scan mode and the continuous-scan mode is signaled to the user by haptic feedback.

EC12) The peripheral of EC7, wherein each transition between the single-scan mode and the continuous-scan mode is signaled to the user by one or more audible tones.

EC13) The peripheral of EC7, wherein each transition between the single-scan mode and the continuous-scan mode is signaled to the user via a predetermined change in one or more light emitting elements of the user interface.

EC14) The peripheral of EC7, further comprising:
  wherein the peripheral is enabled to be selectively removably attached to and operate from a compatible perch for hands-free scanning;
  wherein the peripheral is enabled to be selectively wielded and operated by a user's single hand for hand-held scanning and the predetermined control is enabled to be activated by a digit of the hand during the hand-held scanning.

EC15) The peripheral of EC14, further comprising:
  wherein the peripheral is selectively enabled to automatically transition to the continuous-scan mode when attached to the compatible perch; and
  wherein the peripheral is selectively enabled to automatically transition to the single-scan mode when removed from the compatible perch.

EC16) The peripheral of EC7, wherein the peripheral is further selectively enabled to transition to each of the plurality of scan modes in response to one or more predetermined commands received from the host.

EC17) The peripheral of EC7, wherein the peripheral is further selectively enabled to transition to at least some of the plurality of scan modes as directed by one or more predetermined commands sent by a host application.

EC18) The peripheral of EC7, wherein the peripheral is further selectively enabled to transition between the single-scan mode and the continuous-scan mode as directed by a secure tap command of a host application.

EC19) The peripheral of EC7, wherein the manually commanded transitions between the single-scan mode and the continuous-scan mode are predicated on at least one further predetermined condition.

EC20) The peripheral of EC7, wherein the manually commanded transitions between the single-scan mode and the continuous-scan mode are predicated on the existence of an active connection between the peripheral and the host.

EC21) The peripheral of EC7, wherein the manually commanded transitions between the single-scan mode and the continuous-scan mode are predicated on the logical state of a predetermined configuration bit.

EC22) The peripheral of EC7, further comprising:
  wherein the peripheral is enabled to be selectively removably attached to and operate with external power provided via a predetermined power port for hands-free scanning;
  wherein the peripheral is enabled to operate with an internal power source, the peripheral is further enabled to be selectively wielded and operated by a user's single hand for hand-held scanning, and the predetermined control is enabled to be activated by a digit of the hand during the hand-held scanning.

EC23) The peripheral of EC22, further comprising:
  wherein the peripheral is selectively enabled to automatically transition to the continuous-scan mode when attached to the external power provided via the predetermined power port; and
  wherein the peripheral is selectively enabled to automatically transition to the single-scan mode when removed from the external power provided via the predetermined power port.

EC24) The peripheral of EC22, further comprising:
  wherein the transition between the single-scan mode and the continuous-scan mode is performed contingent on absence of the external power at the predetermined power port.

EC25) The peripheral of EC15, wherein the perch comprises a selected one of a stand, a mount, and a cradle.

EC26) The peripheral of EC7, further comprising:
  a power subsystem enabled to receive and monitor power from a plurality of power sources.

EC27) The peripheral of EC7, wherein the predetermined control is a button and the activation is a button-press.

EC28) The peripheral of EC7, wherein the predetermined control is a trigger and the activation is a trigger depress.

EC29) The peripheral of EC7, wherein the scan engine is an NFC/RFID scan engine.

EC30) The peripheral of EC7, wherein the scan engine is any one or more of an NFC reader, an NFC reader/writer, a RFID reader, and a RFID reader/writer.

EC31) The peripheral of EC7, wherein the scan engine is enabled to read wireless tags.

EC32) The peripheral of EC7, wherein the scan engine is enabled to read one or more of NFC tags and RFID tags.

EC33) The peripheral of EC7, wherein the scan engine is a barcode scan engine.

EC34) The peripheral of EC7, wherein the scan engine is enabled to read optical scan targets.

EC35) The peripheral of EC7, wherein the scan engine is enabled to read one or more of QR codes and linear barcodes.

EC36) The peripheral of EC7, wherein the host is a selected one of a smartphone, a tablet, a laptop computer, a desktop computer, a tower computer, a server computer, and a portable computing device.

EC37) The peripheral of EC7, wherein the host operating system is compatible with a selected version of a selected one of Linux OS, iOS, Android OS, macOS, and Windows OS.

EC38) The peripheral of EC7, wherein the peripheral is enabled to be powered by an internal battery and to communicate wirelessly with the host.

EC39) The peripheral of EC38, wherein the at least one communications subsystem comprises a radio-subsystem compatible with one or more versions of Bluetooth Low Energy.

EC40) The peripheral of EC38, wherein the at least one communications subsystem comprises a radio-subsystem compatible with at least version 4.2 of the Bluetooth Specification.

EC41) The peripheral of EC7, wherein peripheral is enabled to be powered by an external power source and to communicate via wired interconnect with the host.

EC42) The peripheral of EC7, further comprising:
wherein the plurality of scan modes further comprises a configuration card scan mode;
wherein invoking the configuration card scan mode results in the peripheral
a) performing a configuration card scan,
b) preparing the peripheral in accordance with configuration data read by the configuration card scan, and
c) exiting the configuration card scan mode and operating in accordance with the configuration data; and
wherein the configuration card scan mode is entered as manually commanded by a third predetermined activation duration of the same control of the user interface.

EC43) The peripheral of EC7, further comprising:
wherein in the single-scan mode the peripheral further performs respective single scans in response to respective scan requests as remotely commanded by a first command transmitted by the host;
wherein the peripheral further transitions between the single-scan mode and the continuous-scan mode as remotely commanded by a second command transmitted by the host.

EC44) The peripheral of EC42, further comprising:
wherein the configuration card scan mode is further entered as remotely commanded by a third command transmitted by the host.

EC45) An NFC/RFID peripheral comprising:
a hardware processor configured to perform a predefined set of basic operations in response to receiving a corresponding basic instruction selected from a predefined native instruction set of codes;
a memory;
a control subsystem implemented by the hardware processor the memory, the control subsystem coupled to an NFC/RFID scanning engine, and a user interface, the control subsystem comprising
a first set of machine codes selected from the native instruction set for a first scanning behavior of a plurality of scanning behaviors, the first scanning behavior comprising performing a single data scan using the NFC/RFID scanning engine in response to a first button-press duration of a predetermined button of the user interface,
a second set of machine codes selected from the native instruction set for a second scanning behavior of the plurality of scanning behaviors, the second scanning behavior comprising performing continuous unprompted data scans using the NFC/RFID scanning engine, and
a third set of machine codes selected from the native instruction set for transitioning between the first scanning behavior and the second scanning behavior in response to a second button-press duration of the same button of the user interface.

EC46) The NFC/RFID peripheral of EC45, the control subsystem further comprising
a fourth set of machine codes selected from the native instruction set for a third scanning behavior of the plurality of scanning behaviors, the third scanning behavior comprising
a) performing a configuration card scan,
b) preparing the peripheral in accordance with configuration data read by the configuration card scan, and
c) exiting the third scanning behavior and operating in accordance with the configuration data, and
a fifth set of machine codes selected from the native instruction set for invoking the third scanning behavior in response to a third button-press duration of the same button of the user interface.

EC47) A method comprising:
in a single-scan mode, performing respective single scans in response to respective scan requests as manually commanded by a first predetermined activation duration of a predetermined control;
in a continuous-scan mode, performing repetitive scans without requiring respective scan requests;
in a hand-held mode, behaving in accordance with mobile handheld operation;
in a hands-free mode, behaving in accordance with seated unattended operation;
fetching data from each of a plurality of scan discovered tags, formatting the fetched data, and sending the formatted data to a host;
transitioning between the single-scan mode and the continuous-scan mode as manually commanded by a second predetermined activation duration of the predetermined control;
transitioning between the hand-held mode and the hands-free mode in response to predetermined external power port status changes; and
wherein the method is performed in an RFID scanner.

EC48) The peripheral of EC47, wherein the RFID scanner is mobile-operation-ready and comprises a handheld-form-factor.

EC49) The peripheral of EC47, wherein the RFID scanner is enabled to read HF RFID tags and NFC tags.

EC50) The peripheral of EC47, wherein the first predetermined activation duration is equal to or less than one second.

EC51) The peripheral of EC47, wherein the second predetermined activation duration is equal to or greater than five seconds.

EC52) The peripheral of EC47, wherein each transition between the single-scan mode and the continuous-scan mode is signaled to a user by haptic feedback.

EC53) The peripheral of EC47, further comprising:
automatically transitioning to the continuous-scan mode in response to detecting a presence of external power at the predetermined external power port; and
automatically transitioning to the single-scan mode in response to detecting an absence of external power at the predetermined external power port.

EC54) The peripheral of EC47, further comprising:
wherein the transitioning between the single-scan mode and the continuous-scan mode is performed contingent on absence of external power at the predetermined external power port.

EC55) The peripheral of EC47, wherein the predetermined control is a button and the activation is a button-press.

EC56) The peripheral of EC47, wherein the predetermined control is a trigger and the activation is a trigger depress.

EC57) The peripheral of EC47, wherein the host is a selected one of a smartphone, a tablet, a laptop computer, a desktop computer, a tower computer, a server computer, and a portable computing device.

EC58) The peripheral of EC47, wherein the host operating system is compatible with a selected version of a selected one of Linux OS, iOS, Android OS, macOS, and Windows OS.

EC59) The peripheral of EC47, wherein the peripheral is enabled to be powered by an internal battery and to communicate wirelessly with the host.

EC60) The peripheral of EC59, wherein the wireless communication is compatible with one or more versions of Bluetooth Low Energy.

SYSTEM

FIG. 1 illustrates, via a structural system perspective, embodiments of a peripheral device for NFC/RFID scanning employing multiple scanning modes, as System 1000. In some embodiments, a system comprises NRRW 1300 (a NFC/RFID Reader & Writer), Management/Point-Of-Sale Host 1400 (e.g., a tablet, smartphone, laptop, desktop, tower, or equivalent computing device), and Customer devices, such as a Mobile or Wearable device 1500, and/or Coupon, Card, or Object 1800. In various embodiments, Management/Point-Of-Sale Host 1400 is intended to represent a central device, with NRRW 1300 representing a peripheral device.

In some embodiments, NRRW 1300 is a cordless NFC/RFID tag reader/writer enabled for hand-held use (AKA an NFC/RFID hand reader/writer), optimized to operatively read/write NFC and/or RFID targets while being wielded by one hand, and comprises NFC/RFID-Engine 1211 enabled to read and/or write NFC and/or RFID tags. Radio Subsystem 1320 comprises a low-energy Bluetooth radio (BLE) enabled to communicate with Management/Point-Of-Sale Tablet 1400 for receiving configuration commands and for communication of, and status about, decoded NFC and/or RFID targets and various other types of targets. In some embodiments, NRRW 1300 is integral to a terminal stand and is not removable. In some embodiments, NRRW 1300 includes a cordless hand scanner, optimized to operatively scan optical targets while being wielded by one hand, and comprises an optical scan engine, enabled to read optical bar codes of various types. In various embodiments, NRRW 1300 is selectively operable as an NFC/RFID tag cordless hand reader and/or a cordless hand scanner.

Management/Point-Of-Sale Host 1400 comprises Radio Subsystem 1401, Buttons 1405, Display 1404, Nonvolatile storage 1406, Program Storage 1407, and according to embodiment Database Storage 1410. In some embodiments, Management/Point-Of-Sale Tablet 1400 is an Apple iPad running inter alia a Point-Of-Sale (POS) application on top of an Apple IOS operating system. In some embodiments, Management/Point-Of-Sale Tablet 1400 is an Android-compatible device (such as a tablet) running inter alia a Point-Of-Sale (POS) application on top of an Android operating system. In some embodiments, Management/Point-Of-Sale Tablet 1400 is a Windows-compatible device (such as a tablet) running inter alia a Point-Of-Sale (POS) application on top of a Windows operating system. In some embodiments, Radio Subsystem 1401 comprises a WiFi radio and a dual-mode Classic/BLE Bluetooth radio. In some embodiments, the WiFi radio is to communicate via Private WiFi Hot Spot/Router 1601 and Private LAN 1600 with Private Local Server 1605 to access Database Storage 1610. In some embodiments having one or more elements of Off-site 1750, Tablet 1400 optionally also communicates via Internet 1700 with Private Remote Server 1705 to access Database Storage 1710. The various Database Storage instances 1410, 1610, and 1710, are optionally used according to embodiment for one or more of syncing, backup, or caching of database subsets, in accordance with well-known methods.

Mobile or Wearable 1500 is intended to represent one of either a mobile device (such as a smartphone, or tablet, generally having a display) or a wearable device (such as a watch or fitness band, having a small or no display according to embodiment). According to embodiment, Mobile or Wearable 1500 comprises one or more of Radio Subsystem 1501, NFC/RFID Engine 1502, NFC/RFID NVM 1503, Display 1504, Buttons 1505, and NV Storage 1506. In some embodiments, Mobile or Wearable 1500 is a selected one of an IOS smartphone, an Android smartphone, a Windows smartphone, a BlackBerry smartphone, an Apple Watch, a Sony Smartwatch, or an NFC smart wristband, ring, bracelet, necklace, or other jewelry. According to embodiment, Radio Subsystem 1501 is enabled to receive Beacon information (such as from a another BLE radio comprised in System 1000) via, e.g., an included Bluetooth/BLE capability. According to embodiment, mobile devices optionally and/or selectively connect to Internet 1700 either via an integral cellular connection or via Public WiFi Hot Spot/Router 1701. Access to the Public Hot Spot is variously unrestricted, provided as a general customer courtesy, or selectively provided as part of a customer loyalty program (for example, to those Customers that have installed a customer loyalty application, or have met other predetermined customer loyalty criteria), according to embodiment and/or usage scenario.

In various embodiments, Coupon, Card, or Object 1800 is intended to represent one of either an e.g., credit-card sized electronic identity card (such as used for access, transit, and banking) or a printed-paper coupon. According to embodiment, Coupon, Card, or Object 1800 comprises one or more of NFC Tag 1803 or Contactless SmartCard Chip 1805. In some embodiments, Coupon, Card, or Object 1800 is a selected one of an NFC Loyalty Card, a printed coupon, a QR Code Loyalty Card, an Oyster Card, or a Configuration Card (AKA a master card). In various embodiments, Coupon, Card, or Object 1800 is intended to represent any type of NFC tag and/or RFID tag. In various embodiments, Coupon, Card, or Object 1800 is intended to represent any type barcode, e.g., optical barcode such as linear barcode, a 2D barcode, or a QR barcode.

Figure 2:
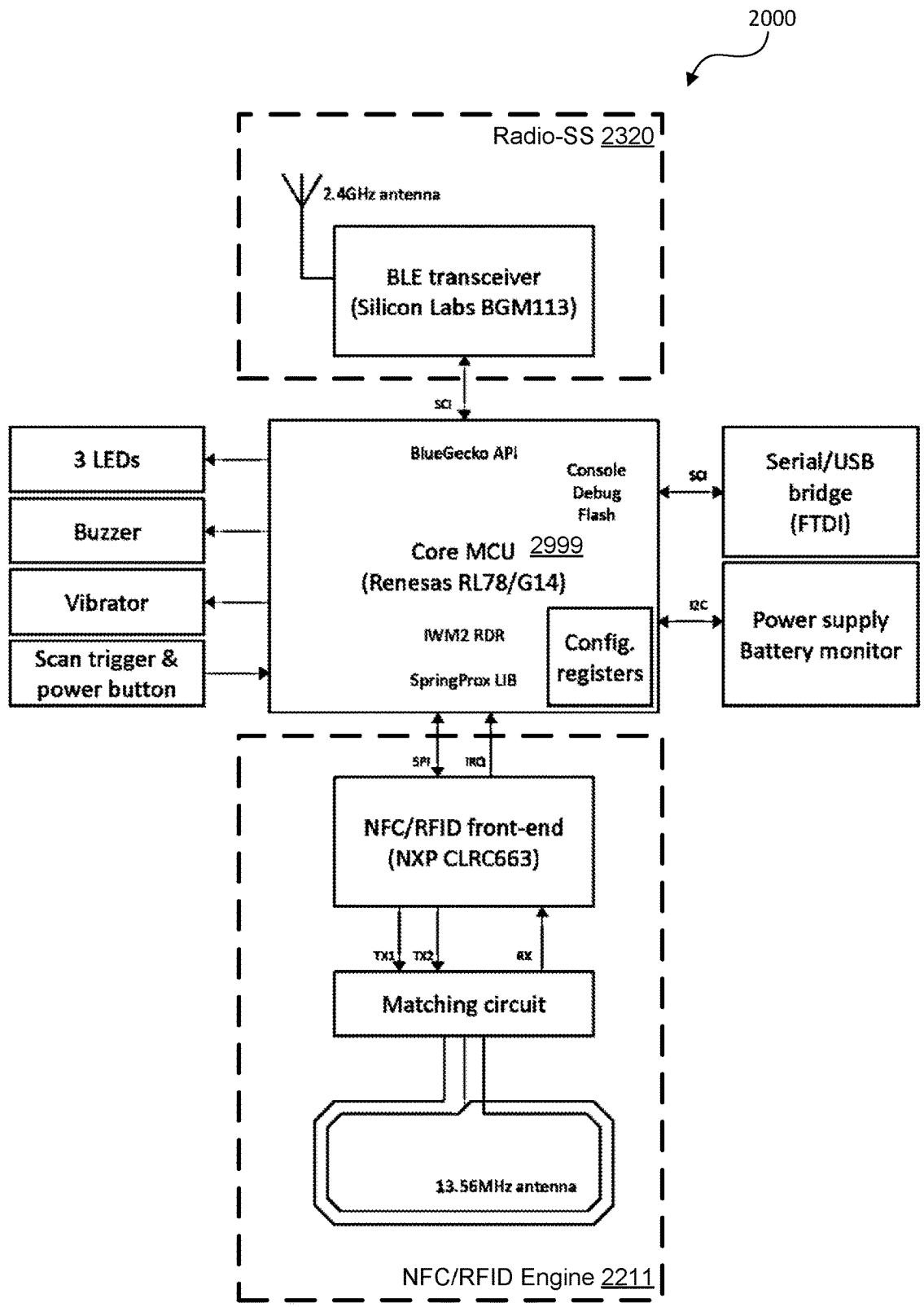
FIG. 2 illustrates, via a structural block diagram perspective, embodiments of a peripheral device for NFC/RFID scanning comprising any combination of a Near Field Communication (NFC) tag reader and/or writer and a Radio Frequency IDentification (RFID) reader and/or writer.

FIG. 2 illustrates, via a structural perspective, embodiments of a peripheral device for NFC/RFID scanning comprising any combination of a Near Field Communication (NFC) tag reader and/or writer and a Radio Frequency IDentification (RFID) reader and/or writer. In various embodiments and/or usage scenarios, any one or more elements and/or portions thereof of FIG. 2 correspond to any one or more elements and/or portions thereof of NRRW 1300 of FIG. 1. As a specific example, Radio-SS 2320 corresponds, in some embodiments, to all or any portions of Radio-SS 1320 of FIG. 1. As another specific example, NFC/RFID-Engine 2211 corresponds, in some embodiments, to all or any portions of NFC/RFID-Engine 1211 of FIG. 1. In some embodiments, Core MCU 2999 is a general-purpose microcontroller having an ultra-low-power 16-bit 32 MHz CPU with an enhanced instruction set. In some embodiments, Core MCU 2999 comprises one or more NVMs and the core is enabled to execute code stored in the NVMs.

Figure 3:
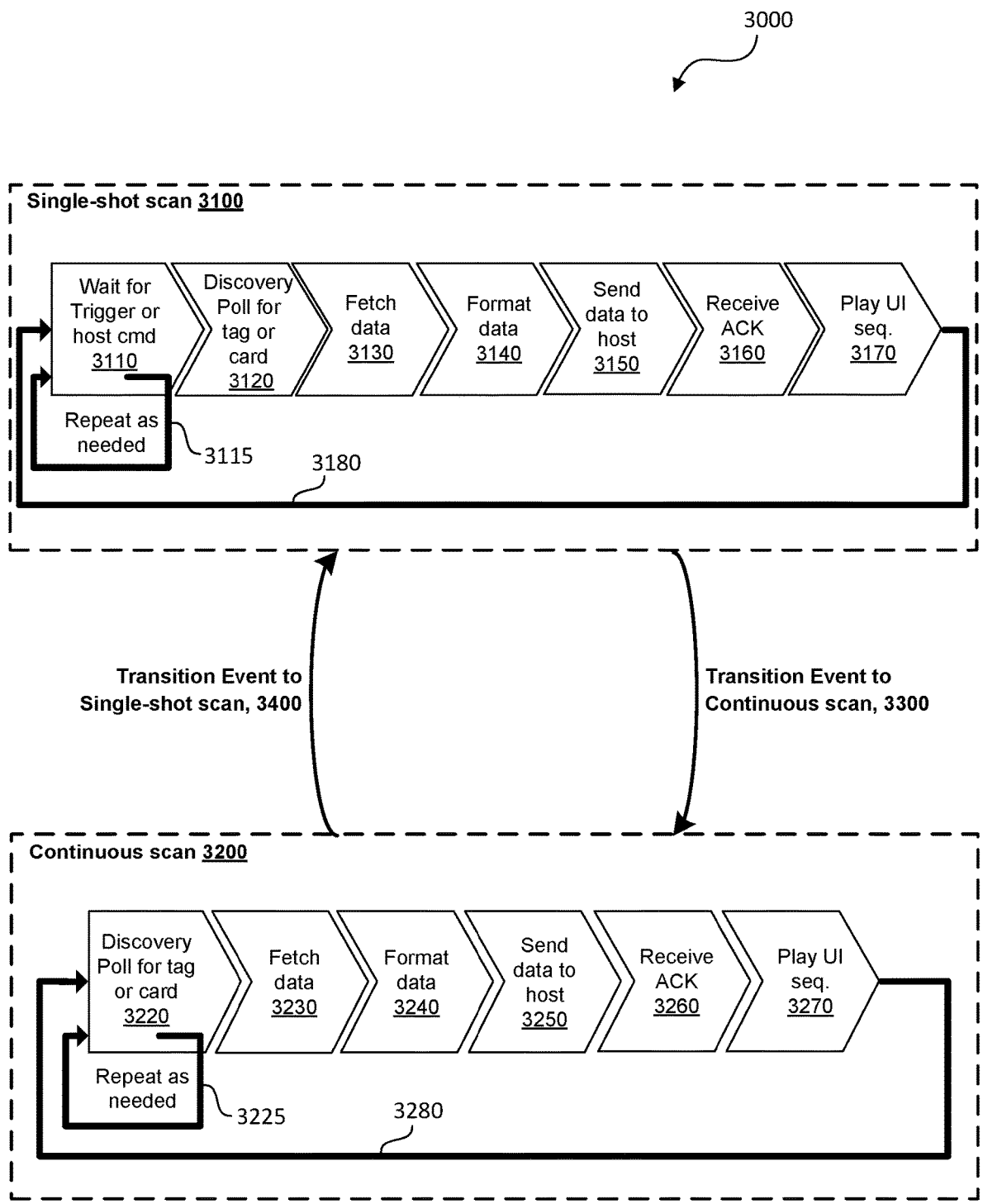
FIG. 3 illustrates, via a process flow diagram, selected operating details of embodiments of the peripheral device for NFC/RFID scanning of FIGS. 1 and 2.

FIG. 3 illustrates, via process flow 3000, selected operating details of embodiments of the peripheral device for NFC/RFID scanning of FIGS. 1 and 2. The device has two basic operating behaviors: a single-shot scan behavior 3100 and a continuous scan behavior 3200. Additional more complicated operating scenarios exist, including Operating Modes (described below) built upon the basic operating behaviors.

In a first embodiment, assuming the NRRW is powered on and connected (unless configured to "run unconnected"), when configured for a Mobile Mode with Auto-Collection, a short trigger press (1 second, or less) initiates a single-shot scan while a long trigger press (5 seconds, or more) toggles (switches) between "single-shot scanning" behavior (AKA "trigger scanning" behavior) and "continuous scanning" behavior. (Mobile Mode is AKA hand-held mode. Auto-Collection is AKA Auto-Scan.) During "single-shot scanning" 3100, when you short press the trigger button (See Wait for Trigger or host cmd 3110, and Repeat as needed 3115), the NRRW will poll (with orange LED illuminated, see Discovery Poll for tag or card 3120) and perform a Fetch data 3130 (read) operation (if a card is discovered in the field). Fetched data is formatted (Format data 3140) and transmitted to the host (Send data to host 3150). In some embodiments the host confirms receipt (Receive ACK 3160), following which the scanner provides feedback to the user (Play UI seq. 3170). Afterwards, the process flow returns 3180 to again Wait for Trigger or host cmd 3110.

If the trigger button press is maintained for 5 seconds or more (corresponding to Transition Event to Continuous scan 3300), at the 5th second the orange LED will illuminate and the NRRW will start repeatedly polling for "continuous scanning". Similarly, during "continuous scanning", a long trigger button press (5 seconds or more, corresponding to Transition Event to Single-shot scan 3400) will toggle back to "single-shot scanning" During "continuous scanning", a short trigger press has no effect as the NRRW is already performing scans repetitively.

During "continuous scanning" 3200, Discovery Poll for tag or card 3220 is Repeat as needed 3225 until a card is discovered in the field. Data is then fetched (Fetch data 3230), formatted (Format data 3240), and transmitted to the host (Send data to host 3250). In some embodiments the host confirms receipt (Receive ACK 3260), following which the scanner provides feedback to the user (Play UI seq. 3270). Afterwards, the process flow returns 3280 to again Discovery Poll for tag or card 3220.

Details according to embodiment: The NRRW provides haptic feedback (vibrating for 100 ms) at the 5th second (when the NRRW toggles to/from trigger/continuous scanning) and the orange RFID LED turns on/off. A tone is optional. If the NRRW is reading during a long press, it will complete the read operation and then toggle behaviors. If the NRRW is in "single-shot scanning" and the trigger button is long pressed and there is no card present, the orange LED will turn off after the polling stops, and then on again at the 5th second. A factory reset will enable Mobile Mode with Auto-Collection by default. It is also possible to configure for Mobile Mode without Auto-Collection (perhaps if the application requires a very long battery life), in which case any long press is ignored.

Figure 4A:
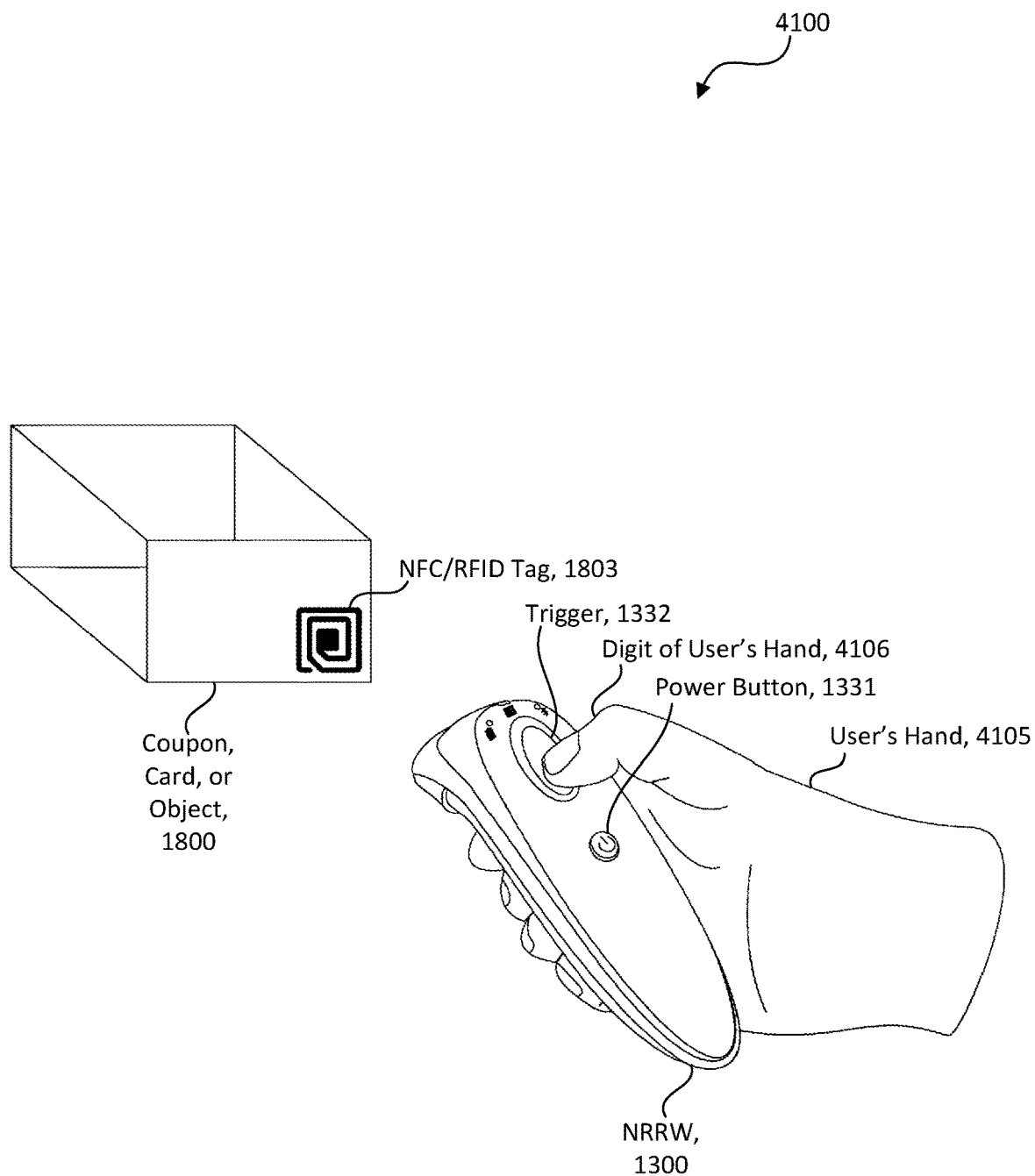
FIG. 4A illustrates aspects of hand-held operation of embodiments of the peripheral device for NFC/RFID scanning of FIGS. 1, 2, and 3.

FIG. 4A illustrates aspects of hand-held operation 4100 of embodiments of the peripheral device for NFC/RFID scanning of FIGS. 1, 2, and 3. Hand-held operation refers both to a condition and an operating mode, the mode being active when the NRRW is on while under battery power. Power is turned on via Power Button 1331. During hand-held operation, the NRRW is held in a user's hand 4105 to perform single-shot scans of one or more of Coupon, Card, or Object 1800, having NFC/RFID tag 1803. Each single-shot scan is initiated by a depression of Trigger 1332 by a Digit of User's Hand 4106. In some embodiments, hand-held operation can be with Auto-Collection enabled or with Auto-Collection disabled, with enabled being the factory reset condition. In hand-held operation with Auto-Collection enabled, the NRRW starts in Single-shot scan, but a long Trigger 1332 button press (5 sec when the NRRW is running connected or configured to run unconnected) toggles between Continuous scan and Single-shot scan. The toggle is confirmed with haptic feedback (a 100 ms vibration) at the 5th second and the Orange RFID LED turns on/off. The NRRW will remember its state (Trigger or Continuous) when it returns to hand-held mode from a period of operation in hands-free mode. In hand-held operation with Auto-Collection disabled, only Single-shot scan is possible. A long Trigger Button press will initiate a single-shot scan and not toggle to Continuous scan.

Figure 4B:
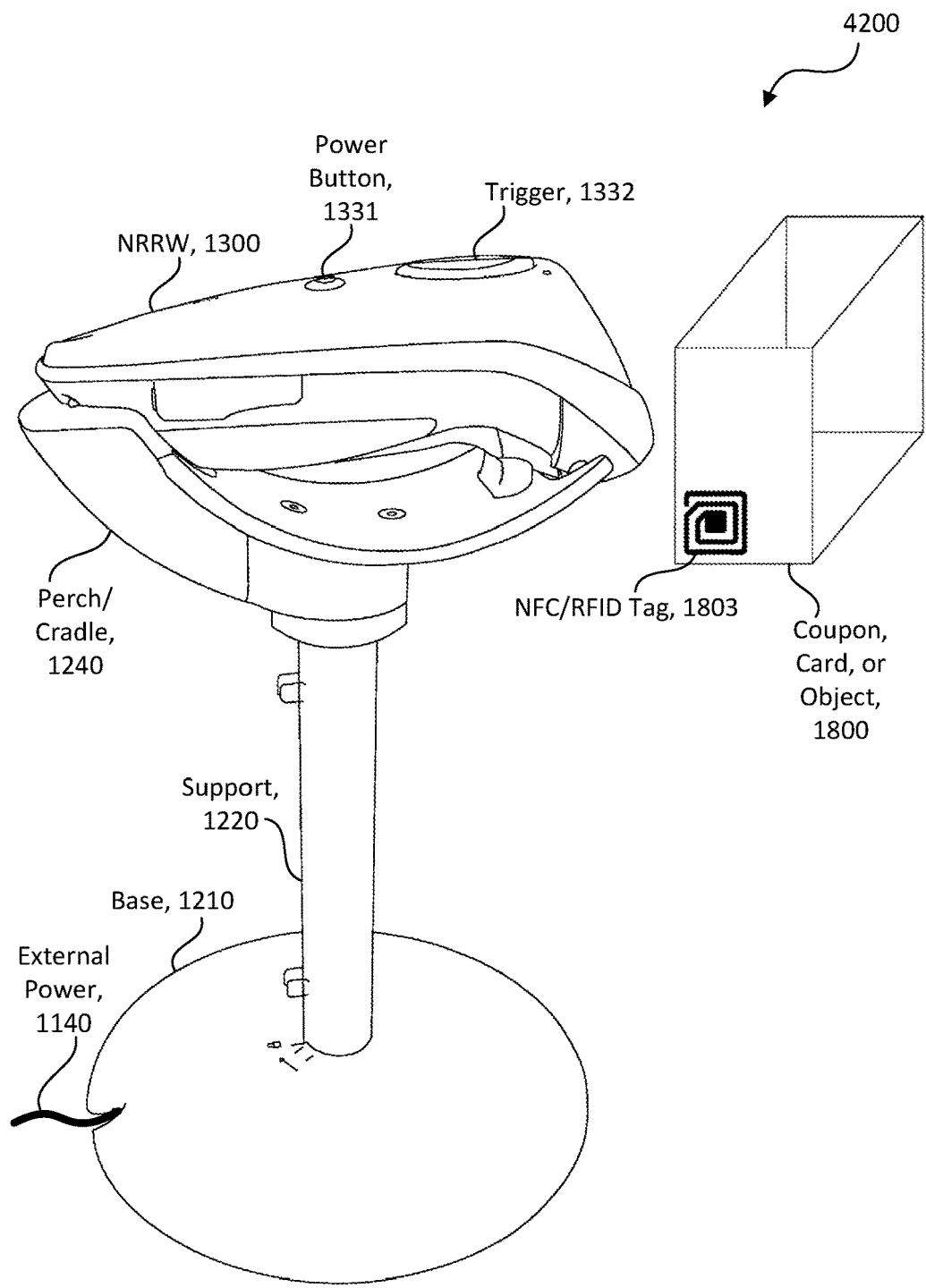
FIG. 4B illustrates aspects of hands-free operation of embodiments of the peripheral device for NFC/RFID scanning of FIGS. 1, 2, and 3.

FIG. 4B illustrates aspects of hands-free operation 4200 of embodiments of the peripheral device for NFC/RFID scanning of FIGS. 1, 2, and 3. Hands-free operation refers both to a condition and an operating mode, the mode being active when the NRRW 1300 is on under "DC from Cradle" power. During hands-free operation, the NRRW is mounted (seated) in a stand, mount, or cradle (e.g. Perch/Cradle 1240), and ready for unattended operation, such as continuous scanning of one or more of Coupon, Card, or Object 1800, having NFC/RFID tag 1803. In FIG. 4B, External Power 1140 is routed under the Base 1210, through (or aside) Support 1220, to Perch/Cradle 1240. An external power port of NRRW 1300 removably mates with a compatible port of the Perch/Cradle 1240, to provide "DC from Cradle" power. In some embodiments, the external power port of NRRW 1300 comprises two recessed male pins. In some embodiments, one or more so-called Stand Modes (AKA Hands-free Modes) are defined (with respective different behaviors) and based on the prior configuration of a particular selection, the selected Stand mode will be active (overriding Mobile Mode) when operating under external "DC from Cradle" power (in the stand, mount, or cradle). In some embodiments, the defined Stand modes comprise Detect, Auto, and Kiosk Modes, as detailed below.

In the Detect Mode of some embodiments, the NRRW enters Hands-free operation (continuous scan, Vibrate and auto power-off timeouts are disabled and stays connected or advertises to reconnect) when "DC from Cradle" Power is detected. When "DC from Cradle" Power is removed, the NRRW reverts to Hand-held operation (Single-shot scan, Vibrate and auto power-off timeouts are enabled).

In the Auto Mode of some embodiments, the NRRW enters Hands-free operation (continuous scan, Vibrate and auto power-off timeouts are disabled and stays connected or advertises to reconnect) when "DC from Cradle" Power is detected. The NRRW continues in Hands-free operation (continuous scan, Vibrate and auto power-off timeouts are disabled and stays connected or advertises to reconnect) even after the "DC from Cradle" Power is removed. But if the Trigger button is pressed while the "DC from Cradle" Power is removed, the NRRW reverts to Hand-held operation (Single-shot scan, Vibrate and auto power-off timeouts are enabled). Auto Mode provides "Low Battery Warning" and "Low Battery Protection" if the "DC from Cradle" Power is removed and the Trigger button is never pressed. In "Low Battery Warning", when the Battery capacity reaches 40% the NRRW will beep (4000 Hz for 100 ms) every 60 seconds until if/when the Battery capacity rises above 40%. In "Low Battery Protection", when the Battery capacity reaches 30% the NRRW will reverts to Hand-held operation (Single-shot scan, Vibrate and auto power-off timeouts are enabled) and remain Hand-held until "DC from Cradle" Power is detected.

In the Kiosk Mode of some embodiments, the NRRW is permanently in Hands-free operation (continuous scan, Vibrate and auto power-off timeouts are disabled, and stays connected or advertises to reconnect) regardless of the presence or absence of "DC from Cradle" Power. If "DC from Cradle" Power is removed, the NRRW continues in Hands-free operation until the Battery is depleted or the mode is changed by the user.

Figure 5:
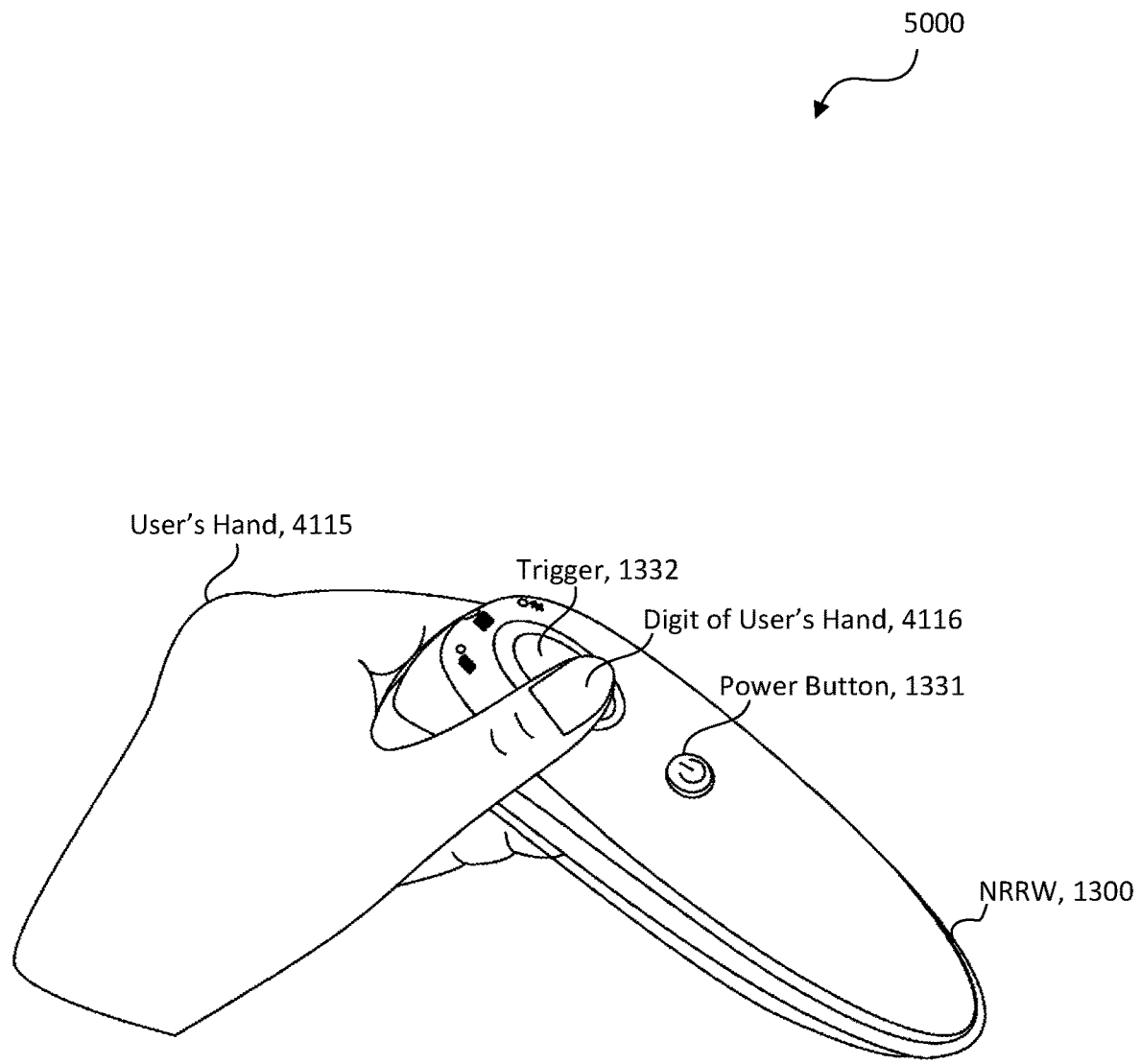
FIG. 5 illustrates aspects of switching operation, between single-shot scanning and continuous scanning, of embodiments of the peripheral device for NFC/RFID scanning of FIGS. 1, 2, and 3.

FIG. 5 illustrates further aspects of switching operation 5000, between single-shot scanning and continuous scanning, of embodiments of the peripheral device for NFC/RFID scanning of FIGS. 1, 2, and 3. It will be appreciated that the Long Press may be executed in a variety of ways. As previously discussed in conjunction with FIG. 4A, the Long Press may be performed with Digit of User's Hand 4106— the same digit of User's Hand 4105 used to Short Press the Trigger for single-shot scans. As but one alternative, as shown in FIG. 5, NRRW 1300 may instead be held in User's Hand 4115 and Digit of User's Hand 4116 used to Long Press the Trigger 1332.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
   discovering an RFID tag;

fetching data from the discovered RFID tag;
formatting the fetched data;
sending the formatted data to a host;
waiting for an acknowledgment from the host;
responsive to receiving the acknowledgement, providing user feedback to a user;
wherein in accordance with a first operating behavior, the discovering is responsive to a request-scan event and in accordance with a second operating behavior the discovering is continuously repetitive in accordance with repetitive polling;
further comprising toggling between the first operating behavior and the second operating behavior responsive to an operating-behavior-toggle event;
wherein the request-scan event and the operating-behavior-toggle event are indicated at least in part by corresponding durations of activating a same pressure-sensitive element by the user; and
wherein the discovering, the fetching, the formatting, the sending, the waiting, the providing, and the toggling are performed by a portable RFID scanner.

2. The method of claim 1, wherein the pressure-sensitive element is a trigger button of the portable RFID scanner.

3. The method of claim 1, wherein the duration corresponding to the request-scan event is equal to or less than one second.

4. The method of claim 1, wherein the duration corresponding to the operating-behavior-toggle event is equal to or greater than five seconds.

5. The method of claim 1, wherein the portable RFID scanner is powered by at least one of an internal battery and at least a first external power source, and wherein when operating in the first operating behavior and the first external power source is removed, when the first external power source is reapplied, operating resumes in the first operating behavior; and when operating in the second operating behavior and the first external power source is removed, when the first external power source is reapplied, operating resumes in the second operating behavior.

6. The method of claim 1, wherein the portable RFID scanner is powered by at least one of an internal battery and at least a first external power source, and wherein in each of the first operating behavior and the second operating behavior, the operating-behavior-toggle event is further indicated by removal of the first external power source; and wherein in each of the first operating behavior and the second operating behavior, the operating-behavior-toggle event is further indicated by restoration of the first external power source.

7. An NFC/RFID peripheral comprising:
a hardware processor configured to perform a predefined set of basic operations in response to receiving a corresponding basic instruction selected from a predefined native instruction set of codes;
a memory;
a control subsystem implemented by the hardware processor the memory, the control subsystem coupled to an NFC/RFID scanning engine, and a user interface, the control subsystem comprising
a first set of machine codes selected from the native instruction set for a first scanning behavior of a plurality of scanning behaviors, the first scanning behavior comprising performing a single data scan using the NFC/RFID scanning engine in response to a first button-press duration of a predetermined button of the user interface,
a second set of machine codes selected from the native instruction set for a second scanning behavior of the plurality of scanning behaviors, the second scanning behavior comprising performing continuous unprompted data scans using the NFC/RFID scanning engine, and
a third set of machine codes selected from the native instruction set for transitioning between the first scanning behavior and the second scanning behavior in response to a second button-press duration of the same button of the user interface.

8. A method comprising:
in a single-scan mode, performing respective single scans in response to respective scan requests as manually commanded by a first predetermined activation duration of a predetermined control;
in a continuous-scan mode, performing repetitive scans without requiring respective scan requests;
in a hand-held mode, behaving in accordance with mobile handheld operation;
in a hands-free mode, behaving in accordance with seated unattended operation;
fetching data from each of a plurality of scan discovered tags, formatting the fetched data, and sending the formatted data to a host;
transitioning between the single-scan mode and the continuous-scan mode as manually commanded by a second predetermined activation duration of the predetermined control;
transitioning between the hand-held mode and the hands-free mode in response to predetermined external power port status changes; and
wherein the method is performed in an RFID scanner.

9. The peripheral of claim 8, wherein the RFID scanner is mobile-operation-ready and comprises a handheld-form-factor.

10. The peripheral of claim 8, wherein the RFID scanner is enabled to read HF RFID tags and NFC tags.

11. The peripheral of claim 8, wherein the first predetermined activation duration is equal to or less than one second.

12. The peripheral of claim 8, wherein the second predetermined activation duration is equal to or greater than five seconds.

13. The peripheral of claim 8, wherein each transition between the single-scan mode and the continuous-scan mode is signaled to a user by haptic feedback.

14. The peripheral of claim 8, further comprising:
automatically transitioning to the continuous-scan mode in response to detecting a presence of external power at the predetermined external power port; and
automatically transitioning to the single-scan mode in response to detecting an absence of external power at the predetermined external power port.

15. The peripheral of claim 8, further comprising:
wherein the transitioning between the single-scan mode and the continuous-scan mode is performed contingent on absence of external power at the predetermined external power port.

16. The peripheral of claim 8, wherein the predetermined control is a button and the activation is a button-press.

17. The peripheral of claim 8, wherein the predetermined control is a trigger and the activation is a trigger depress.

18. The peripheral of claim 8, wherein the host is a selected one of a smartphone, a tablet, a laptop computer, a desktop computer, a tower computer, a server computer, and a portable computing device.

19. The peripheral of claim 8, wherein the host operating system is compatible with a selected version of a selected one of Linux OS, iOS, Android OS, macOS, and Windows OS.

20. The peripheral of claim 8, wherein the peripheral is enabled to be powered by an internal battery and to communicate wirelessly with the host.

21. The peripheral of claim 20, wherein the wireless communication is compatible with one or more versions of Bluetooth Low Energy.

* * * * *